US006726465B2

(12) United States Patent
Groleau

(10) Patent No.: US 6,726,465 B2
(45) Date of Patent: Apr. 27, 2004

(54) INJECTION MOLDING MACHINE EMPLOYING A FLOW PATH GEAR PUMP AND METHOD OF USE

(76) Inventor: Rodney J. Groleau, 1753 Apache Pass, Traverse City, MI (US) 49684

( * ) Notice: Subject to any disclaimer, the term of this patent is extended or adjusted under 35 U.S.C. 154(b) by 0 days.

(21) Appl. No.: 09/953,089

(22) Filed: Sep. 14, 2001

(65) Prior Publication Data

US 2002/0102324 A1 Aug. 1, 2002

Related U.S. Application Data

(63) Continuation of application No. 09/237,738, filed on Jan. 26, 1999, now abandoned, which is a continuation-in-part of application No. 08/821,615, filed on Mar. 20, 1997, now Pat. No. 5,863,485.
(60) Provisional application No. 60/013,879, filed on Mar. 22, 1996.

(51) Int. Cl.[7] ............................................... B29C 37/00
(52) U.S. Cl. ........................ 425/214; 366/77; 366/190; 425/567
(58) Field of Search ................ 425/214, 567; 366/77, 190

(56) References Cited

U.S. PATENT DOCUMENTS

| | | | | |
|---|---|---|---|---|
| 2,982,221 A | * | 5/1961 | Whitfield ..................... 418/200 |
| 4,168,739 A | * | 9/1979 | Smith et al. ................. 164/155 |
| 4,286,882 A | * | 9/1981 | Schiesser ...................... 366/76 |
| 4,537,568 A | * | 8/1985 | Larsson ....................... 418/202 |
| 4,663,096 A | * | 5/1987 | Uenoyama et al. ........ 264/40.6 |
| 4,721,589 A | * | 1/1988 | Harris ........................ 264/40.1 |
| 5,011,399 A | * | 4/1991 | Farrell ......................... 425/557 |
| 5,048,405 A | * | 9/1991 | Takahashi et al. ............ 99/470 |
| 5,179,521 A | * | 1/1993 | Edge ........................... 364/473 |
| 5,236,641 A | * | 8/1993 | Allen et al. ................. 264/40.1 |
| 5,507,631 A | * | 4/1996 | Hodan ......................... 418/205 |
| 5,897,818 A | * | 4/1999 | Lewit et al. ................ 264/45.8 |

* cited by examiner

Primary Examiner—W. L. Walker
Assistant Examiner—Emmanuel Luk
(74) Attorney, Agent, or Firm—James M. Deimen

(57) ABSTRACT

A method and apparatus for synchronizing the flows of molten polymer or similar materials in molding systems which utilize manifolds to direct flow into one or more cavities of an injection mold. The apparatus utilizes intermeshing positive displacement, interconnected gearing systems similar to positive displacement gear pumps in hydraulic systems. These positive displacement gear mechanisms are placed in each parallel flow channel such that all flow in each channel passes through a gear mechanism. After a mold cavity is filled, the gear mechanisms can be utilized as melt pumps to continue packing or holding plastic in the mold cavity. By reversing the pump mechanisms, precise decompression of the flow channels to eliminate gate stringing and other adverse effects can be accomplished.

7 Claims, 3 Drawing Sheets

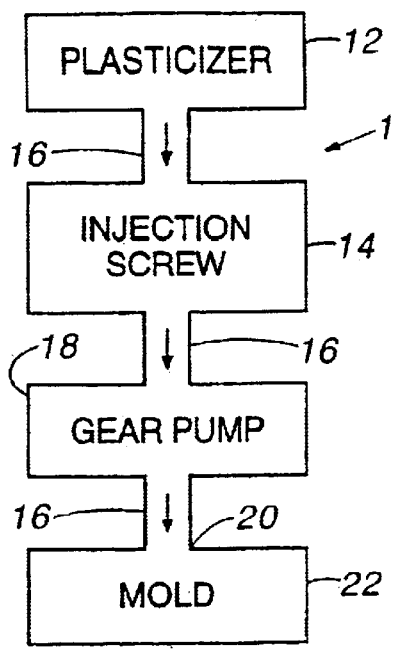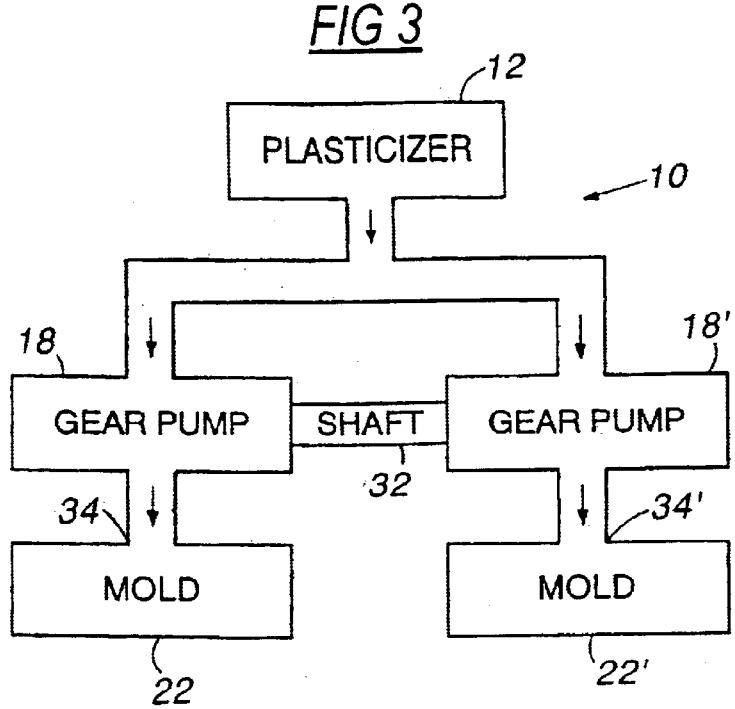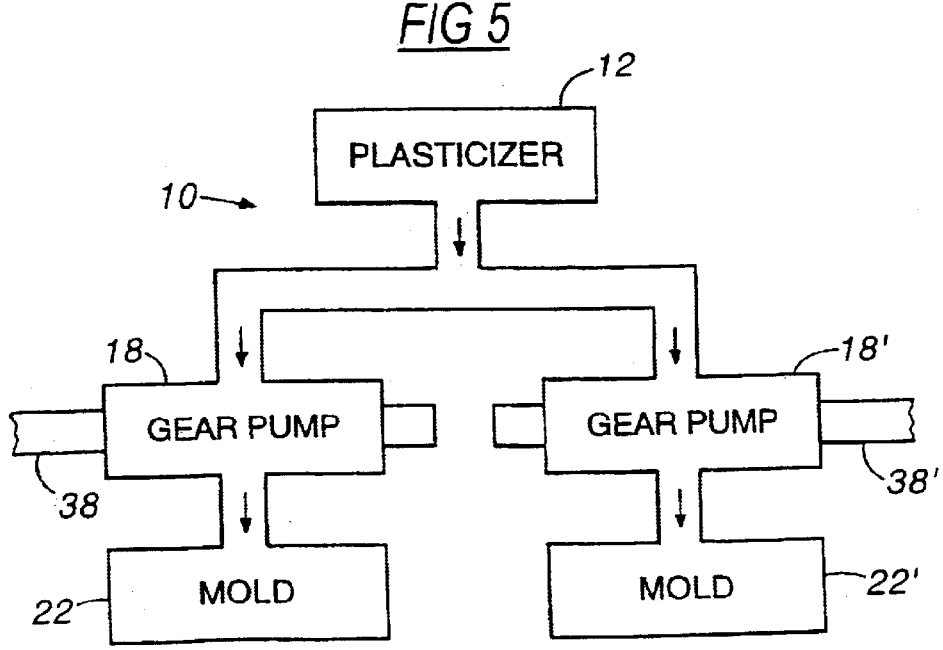

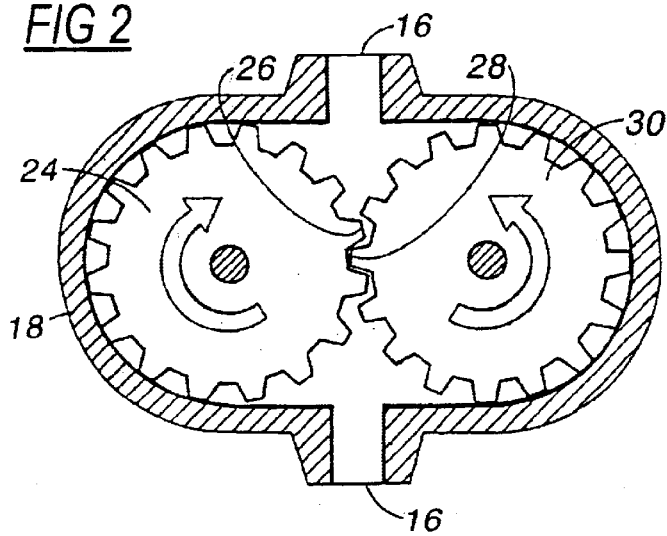
FIG 2
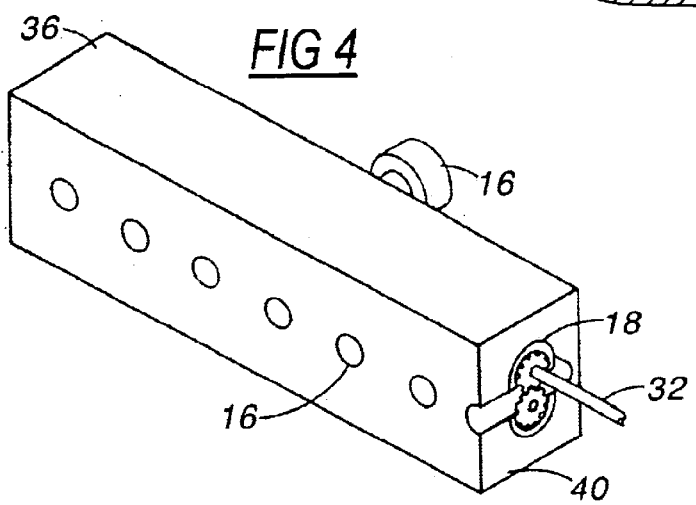
FIG 4
METHOD FOR EMPLOYING A GEAR PUMP
WITH AN INJECTION MOLDING MACHINE
COMPRISING THE STEP OF
FIG 6
FLUIDLY CONNECTING THE GEAR PUMP
INTO A FLOW CHANNEL BETWEEN A
PLASTICIZER AND A MOLD

INJECTION MOLDING MACHINE EMPLOYING A FLOW PATH GEAR PUMP AND METHOD OF USE

Claim is made to provisional patent application Ser. No. 60/013,879 filed Mar. 22, 1996. This application is a continuation of application Ser. No. 09/237,738, filed Jan. 26, 1999 now abandoned, in turn a continuation-in-part of application Ser. No. 08/821,615, filed Mar. 20, 1997, now U.S. Pat. No. 5,863,485.

BACKGROUND OF THE INVENTION

The field of the invention pertains to plastic injection molding, and in particular, to plastic injection molding machines.

A typical plastic injection molding machine utilizes a plasticizer screw to melt and move the plastic material, a mold, a gate for the mold and an injector to place the material in the mold. The above components of the machine are connected via a flow channel for the molten material. Hot runner flow channel manifolds are sometimes used to keep the material in a molten state during delivery.

Such a plastic injection molding machine is disclosed in U.S. Pat. No. 4,734,243. This machine includes a plurality of plunger injection devices, one for each mold.

Unfortunately, non-repeatability and the ensuing quality degradation therefrom are sometimes observed with multiple parallel flow channels leading to multiple molds. Part of the problem is the non-Newtonian behavior of polymers which vary in viscosity with flow rate. Variation in tip temperature and flow impedance in the mold cavity are other contributors to the problem.

Therefore, a more effective injection molding machine and method for molding is an advantageous goal. Such a more effective machine and method are disclosed below.

SUMMARY OF THE INVENTION

The invention comprises a gear pump disposed in a flow channel of a plastic injection molding machine between the plasticizer and the mold. The gear pump envisioned for use herein is an intermeshing positive displacement interconnected gear pump. Molten plastic in the flow channel passes through the chamber of the gear pump. The gear pump can be either driven internally by the material flowing through the gear pump, or the gear pump can be driven externally by rotating the drive shaft of the pump with a motor.

The flow can be controlled by varying the speed of rotation of the drive shaft. After the mold is filled, the gear pump can be used as a melt pump to continue packing or holding the material in the mold. Reversing the rotation of the gear pump decompresses the material, eliminating gate stringing.

Multiple gear pumps can be used to provide a gear pump in each of several flow channels feeding each of several gates or multiple molds. Multiple gear pumps can be synchronized directly on a single shaft or indirectly by using hydraulic or stepper motors. Alternatively, the multiple gear pumps can be synchronized or non-synchronized on multiple separate shafts. Non-synchronized pumps allow each gate or mold to be filled independently of other gates and molds. Further, it may be advantageous to synchronize the gear pump with the screw of the plasticizer to ensure consistent flow through the machine.

BRIEF DESCRIPTION OF THE DRAWINGS

FIG. 1 illustrates a schematic block diagram of the device according to the invention with one gear pump in the flow channel;

FIG. 2 illustrates a sectional view through a gear pump;

FIG. 3 illustrates a schematic block diagram of two or more gear pumps synchronized on a single shaft;

FIG. 4 illustrates a perspective schematic view of a manifold and multiple gear pump combination according to the invention;

FIG. 5 illustrates a schematic view of multiple gear pumps on separate non-synchronous shafts;

FIG. 6 illustrates the method for employing a gear pump with an injection molding machine;

DESCRIPTION OF THE PREFERRED EMBODIMENTS

Figure 7:
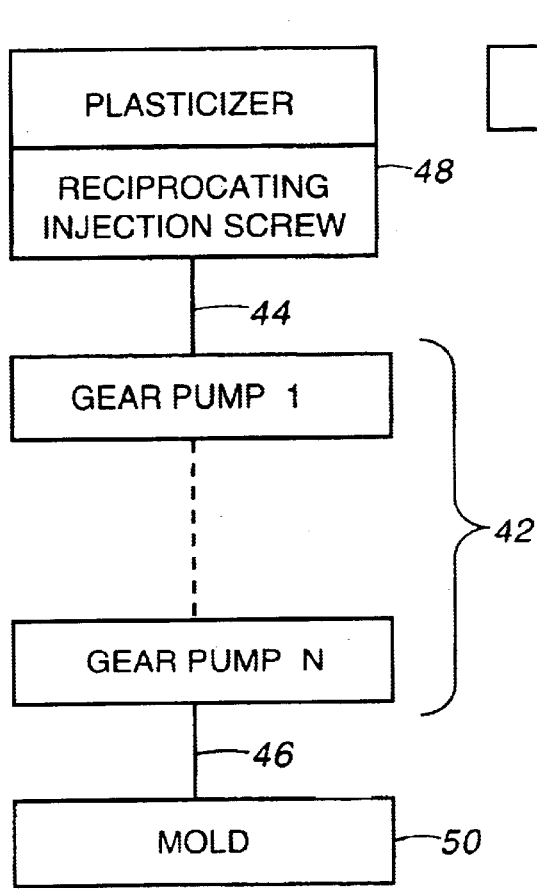
FIG. 7 illustrates a schematic view of multiple gear pumps in series in a flow path.

In FIG. 1 an injection molding machine 10 is illustrated schematically as having a plasticizer 12 with an injection screw 14, and a flow channel 16 from the plasticizer 12 to direct plasticized material through a gear pump 18 into an injector gate 20 and thus into a mold 22 to receive the molten material.

In FIG. 2 the gear pump 18 is shown in section. A first gear 24 has teeth 26 that mesh with the teeth 28 on a second gear 30. Plasticized material moving through the gear pump 18 is thus compressed or decompressed by directing the rotation of the gear pump 18.

In FIG. 3 an injection molding machine 10 is illustrated schematically as having two or more gear pumps 18, 18' interconnected by a single shaft 32. The gear pumps are synchronized by the same shaft 32 and feed multiple gates 34, 34' to multiple mold cavities 22, 22' in parallel. The single shaft 32 to all the gear pumps creates consistent pressure and flow generated by all the pumps. If the gear pumps 18 and 18' are not driven externally by the shaft 32 and a motor, but are driven by the flow of material through the pumps, then the pressures in the flow channels are equalized by the gear pump shaft interconnection.

In FIG. 4 a manifold 36 is illustrated. The manifold 36 internally contains multiple gear pumps each intercepting multiple channels 16, one gear pump 18 at the manifold end 40 being shown. The gear pumps 18 can be operated from a single shaft 32 extending lengthwise through the manifold 36.

In FIG. 5 multiple gear pumps 18, 18' for an injection molding machine 10 are illustrated on separate non-synchronous shafts 38, 38' each attachable to separate motors. With this configuration the volume of plastic and injection pressure can be independently adjusted by adjusting motor speed and torque.

The multiple gear pumps can be connected by indirect means such as a hydraulic motor, stepper motor or DC or AC servo motor. In this case, flow could be proportioned into each of the flow channels by proportioning the speed of rotation with a control system instead of by positive means of a shaft.

In FIG. 6 a method for employing a gear pump with an injection molding machine is illustrated. The method comprises placing a gear pump in the flow channel between the plasticizer and the mold and operating the gear pump to eliminate voids, improve packing and finally decompress the material.

As molten plastic flow passes through the gear pumps, the rotation imparted by or on the gears is in direct proportion to the amount of material passing through the gears. Thus, the gears act as precise devices to meter the quantity of plastic injected into each mold cavity.

Where a gear pump is not motor driven, the intermeshing teeth between the gears provide the differential area which allows the pressure of the incoming plastic to impart rotation of the gears, thus driving the gears and allowing flow through the pump. Molten plastic enters the pump and passes around the periphery of the pump chamber in between the various teeth of the gears. If the gears are driven by a motor, the pump acts as a true pump in addition to a metering device, driving the molten plastic forward into the mold cavity, or if reversed, pulling plastic back out of the gate or mold cavity.

Placing multiple gear pump mechanisms in each of the multiple drops of a manifold and connecting them via a shaft connected to one of the gears in each pump mechanism effectively synchronizes these positive displacement devices. If the injection screw of the molding machine injects plastic into the parallel channels as shown in FIGS. 3 and 4, the flow will be metered and proportioned in direct relationship to the displacement of each of the pump mechanisms. If the pump mechanisms are of equal displacement, flow will be proportioned equally. This approach would be used in multiple cavities for the same part where equal volumes are to be dispensed in each of the cavities. Or in the case of a single cavity, where equal flows are desired to fill an equal percentage of the single cavity area.

In the case where mold cavities of different sizes are to be filled, or if unequal flows are to be directed into one cavity, the volume of the gear mechanisms can be varied either by varying the size of the gears or the axial thickness of the gears. These configurations will allow unequal flows to be controlled in a proportional manner in each of the multiple flow channels both during fill and during pack and hold.

In some situations, the positive displacement gear pumps can be driven during fill to supplement the pressurization during flow and packing of the mold cavity to effectively increase the intensification ratio of the injection machine and thus allow higher pressures to be generated in the mold. Motor driving the pump mechanism also allows packing of the mold and holding pressure on the mold while the injection molding screw is rotated for the next shot. With appropriate timing, the reverse rotation of the pump mechanism can also be used to decompress the melt in the downstream area of the melt channel to eliminate stringing, drool and other adverse effects. These modifications improve the cycle time capability and the preciseness of the process.

If the individual pump mechanisms are controlled by individual devices which impede rotation, which could include simple locking pins, the system could be used to sequentially fill a mold cavity by allowing only one or less than all of the parallel flow channels to be free to fill at any given time. The gear pump system could also be used in conjunction with gas assist or structural foam molding which utilizes hot manifolds or also be used with the injection molding of highly filled metal powder plastic molding.

In FIG. 7 a plurality of gear pumps (1 through N) 42 are located in series in a flow channel 44, 46 between the reciprocating injection screw 48 and a mold 50. The reciprocating injection screw 48 provides a quantity of plasticized material at high pressure, the high pressure being further increased by the plurality of gear pumps 42 in series. The gear pumps 42 are powered to increase the pressure of the plasticized material to the desired pressure at the entrance to the mold 50. In this manner the capability of the mold 50 to accommodate very high pressure can be met by an injection screw 48 and plurality of gear pumps 42 that individually could not produce the injection pressure desired.

Figure 8:
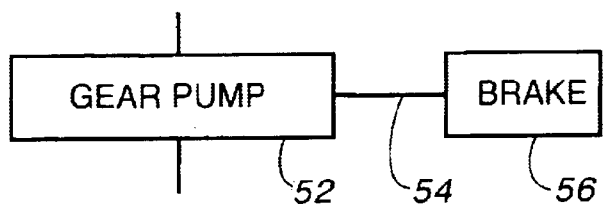
FIG. 8 illustrates a brake on a gear pump.

In FIG. 8 a gear pump 52 which may or may not be powered includes a shaft 54 extending from the pump to a brake 56. The term brake is used broadly to include the locking pin noted above to prevent rotation as well as frictional devices such as disc brakes and clutches which may fully stop or merely slow movement of the pump 52. Such brakes may be used to retard one or more of a plurality of gear pumps depending on the application.

I claim:

1. An injection molding machine utilizing a plasticizer, at least one mold for receiving plasticized material from the plasticizer, and at least one flow channel between the plasticizer and the at least one mold, the injection molding machine comprising, a plurality of gear pumps fluidly connected in the at least one flow channel between the plasticizer and the at least one mold, at least one of the gear pumps being separately powered for selectable non-synchronous movement relative to the other gear pumps, braking means connected to the separately powered at least one of the gear pumps, said braking means adapted to momentarily retard during each cycle of the injection molding machine the connected separately powered at least one of the gear pumps, wherein the plurality of gear pumps are located in parallel in a plurality of flow channels.

2. The injection molding machine of claim 1 wherein at least one of the plurality of gear pumps is reversible.

3. An injection molding machine utilizing a plasticizer, at least one mold for receiving plasticized material from the plasticizer, and at least one flow channel between the plasticizer and the at least one mold, the injection molding machine comprising, a plurality of gear pumps fluidly connected in the at least one flow channel between the plasticizer and the at least one mold, at least one of the gear pumps being separately powered for selectable non-synchronous movement relative to the other gear pumps, the gear pumps being powered to increase the pressure of the plasticized material moving forward during each cycle through the flow channel, and control means to selectably change the pressure generated by the at least one separately powered gear pump during and after the injection of plasticized material into the at least one mold, wherein the plurality of gear pumps are located in parallel in a plurality of flow channels.

4. The injection molding machine of claim 3 wherein the control means to selectably change the pressure comprise means to momentarily increase the gear pump flow rate to pack the at least one mold.

5. The injection molding machine of claim 3 wherein the control means to selectably change the pressure comprise means to momentarily decrease the gear pump flow rate to decompress the at least one mold.

6. The injection molding machine of claim 3 wherein at least one of the plurality of gear pumps is reversible.

7. The injection molding machine of claim 3 wherein the volumetric displacement per revolution of at least one gear pump of the plurality of gear pumps differs from the volumetric displacement of at least one other gear pump.

\* \* \* \* \*